(12) United States Patent
Mouser et al.

(10) Patent No.: US 10,875,499 B2
(45) Date of Patent: Dec. 29, 2020

(54) VEHICLE OCCUPANT AUTHENTICATION SYSTEM

(71) Applicant: NAVIGATION SOLUTIONS, LLC, Plano, TX (US)

(72) Inventors: Michael J. Mouser, Parker, TX (US); Philip A. Weaver, Plano, TX (US); Donald J. Finney, West Bloomfield, MI (US)

(*) Notice: Subject to any disclaimer, the term of this patent is extended or adjusted under 35 U.S.C. 154(b) by 699 days.

(21) Appl. No.: 14/858,161

(22) Filed: Sep. 18, 2015

(65) Prior Publication Data

US 2016/0082926 A1 Mar. 24, 2016

Related U.S. Application Data

(60) Provisional application No. 62/052,710, filed on Sep. 19, 2014.

(51) Int. Cl.
*B60R 25/20* (2013.01)
*B60R 25/25* (2013.01)
*B60R 25/01* (2013.01)
*B60R 25/23* (2013.01)

(52) U.S. Cl.
CPC .............. *B60R 25/20* (2013.01); *B60R 25/01* (2013.01); *B60R 25/23* (2013.01); *B60R 25/25* (2013.01); *B60R 25/252* (2013.01); *B60R 25/255* (2013.01)

(58) Field of Classification Search
None
See application file for complete search history.

(56) References Cited

U.S. PATENT DOCUMENTS

| | | | |
|---|---|---|---|
| 5,650,774 A * | 7/1997 | Drori | G07C 9/00111 340/12.23 |
| 7,234,157 B2 * | 6/2007 | Childs | G06F 21/31 726/18 |
| 7,466,847 B2 | 12/2008 | Komura | |
| 7,679,486 B2 * | 3/2010 | Okada | B60R 25/24 340/426.1 |
| 8,527,146 B1 * | 9/2013 | Jackson | B60W 50/0098 701/36 |
| 9,252,951 B1 * | 2/2016 | Katzer | G07C 9/00309 |
| 2006/0215884 A1 | 9/2006 | Ota | |
| 2007/0285209 A1 * | 12/2007 | Heusi | G06Q 10/02 340/5.23 |

(Continued)

*Primary Examiner* — David P. Merlino

(57) ABSTRACT

A method is disclosed that is implemented by a computing device in a vehicle. Identifying information is obtained from an occupant of the vehicle via an input device operatively connected to the computing device. If the computing device has connectivity to a remote authentication server, the computing device transmits a request to the authentication server, and controls whether full operation of the vehicle is enabled or disabled based on a response from the remote authentication server. The request includes the identifying information and a vehicle identifier of the vehicle, and requests that the authentication server determine, based on the identifying information and the vehicle identifier, whether the occupant is authorized to operate the vehicle. If the computing device lacks connectivity to the remote authentication server, full operation of the vehicle is temporarily enabled until the computing device has connectivity to the remote authentication server.

18 Claims, 5 Drawing Sheets

(56) References Cited

U.S. PATENT DOCUMENTS

| | | | |
|---|---|---|---|
| 2011/0112969 A1* | 5/2011 | Zaid | G06Q 10/02 |
| | | | 701/2 |
| 2012/0148117 A1 | 6/2012 | Chang | |
| 2012/0281097 A1 | 11/2012 | Wood | |
| 2013/0031057 A1* | 1/2013 | Vakili | G06F 11/1458 |
| | | | 707/640 |
| 2013/0257591 A1* | 10/2013 | Nishimura | B60R 25/24 |
| | | | 340/5.72 |
| 2013/0311001 A1 | 11/2013 | Hampiholi | |
| 2015/0161832 A1* | 6/2015 | Esselink | B60R 25/24 |
| | | | 340/5.22 |
| 2015/0363986 A1* | 12/2015 | Hoyos | G07C 9/00563 |
| | | | 340/5.61 |

\* cited by examiner

VEHICLE OCCUPANT AUTHENTICATION SYSTEM

RELATED APPLICATIONS

This application claims priority to U.S. Provisional Application Ser. No. 62/052,710, filed Sep. 19, 2014, the disclosure of which is incorporated by reference herein in its entirety.

TECHNICAL FIELD

The present disclosure relates to user authentication, and more particularly to authentication for an occupant of a vehicle, such as a rental vehicle.

BACKGROUND

Car rental companies often maintain fleets of many thousands of vehicles for rental to patrons. When one rents a car from such a fleet, it is often required to specify who the drivers of the rental car will be before the rental is commenced. This may be necessary to ensure that the rental car is properly insured for each driver and/or to ensure that any multiple driver surcharges are imposed. Car rental companies have lacked a way to ensure compliance with patron indications of who will operate a rental vehicle.

SUMMARY

According to one aspect of the present disclosure, a method is disclosed that is implemented by a computing device in a vehicle. Identifying information is obtained from an occupant of the vehicle via an input device operatively connected to the computing device. If the computing device has connectivity to a remote authentication server, the computing device transmits a request to the authentication server, and controls whether full operation of the vehicle is enabled or disabled based on a response from the remote authentication server. The request includes the identifying information and a vehicle identifier of the vehicle, and requests that the authentication server determine, based on the identifying information and the vehicle identifier, whether the occupant is authorized to operate the vehicle. If the computing device lacks connectivity to the remote authentication server, full operation of the vehicle is temporarily enabled until the computing device has connectivity to the remote authentication server.

In one or more non-limiting embodiments, the response is received at the computing device from the remote authentication server, and controlling whether full operation of the vehicle is enabled or disabled comprises disabling the vehicle if the response indicates that the occupant is not authorized to operate the vehicle.

In one or more non-limiting embodiments, the response is sent from the remote authentication server to a mobile device of the occupant and includes an authentication code. In some such embodiments, controlling whether full operation of the vehicle is enabled or disabled based on the response comprises enabling full operation of the vehicle if the authentication code is correctly received from the occupant; and disabling full operation of the vehicle if either of the following occurs: an incorrect authentication code is received from the occupant, and no authentication code is received from the occupant within a predefined time period.

In a further non-limiting embodiment of any of the foregoing methods, disabling full operation of the vehicle comprises transmitting a command on a vehicle bus of the vehicle to disable an ignition of the vehicle.

A variety of different types of identifying information may be used. For example, in some embodiments, the identifying information comprises an authentication code (e.g., a PIN code) entered by the occupant or received from a mobile device of the occupant. In some embodiments, the identifying information comprises a signature of the occupant. In some embodiments, the identifying information comprises biometric information of the occupant (e.g., a retinal scan, an iris scan, a fingerprint scan, and/or a photograph of the occupant's face). In some embodiments, the identifying information comprises a photograph of an authenticating document of the occupant.

According to another aspect of the present disclosure, a complementary computing device is disclosed that comprises a wireless transceiver configured to provide connectivity to a remote authentication server, an input device, and processing circuitry operatively connected to the wireless transceiver and the input device. The processing circuitry is configured to obtain identifying information from an occupant of a vehicle via the input device. The processing circuitry is further configured to, if the computing device has connectivity to the remote authentication server: transmit a request to the authentication server and control whether full operation of the vehicle is enabled or disabled based on a response from the remote authentication server. The request includes the identifying information and a vehicle identifier of the vehicle, and requests that the authentication server determine, based on the identifying information and the vehicle identifier, whether the occupant is authorized to operate the vehicle. The processing circuitry is further configured to, if the computing device lacks connectivity to the remote authentication server, temporarily enable full operation of the vehicle until the computing device has connectivity to the remote authentication server.

In one or more non-limiting embodiments, the response is received at the computing device from the remote authentication server, and to control whether full operation of the vehicle is enabled or disabled, the processing circuitry is configured to disable the vehicle if the response indicates that the occupant is not authorized to operate the vehicle.

In one or more non-limiting embodiments, the response is sent from the remote authentication server to a mobile device of the occupant and includes an authentication code. In some such embodiments, to control whether full operation of the vehicle is enabled or disabled based on the response, the processing circuitry is configured to enable full operation of the vehicle if the authentication code is correctly received from the occupant; and disable full operation of the vehicle if either of the following occurs: an incorrect authentication code is received from the occupant, and no authentication code is received from the occupant within a predefined time period.

In a further non-limiting embodiment of any of the foregoing computing devices, to disable full operation of the vehicle, the processing circuitry is configured to transmit a command on a vehicle bus of the vehicle to disable an ignition of the vehicle A variety of different types of identifying information may be used. For example, in some embodiments, the identifying information comprises an authentication code (e.g., a PIN code) entered by the occupant or received from a mobile device of the occupant. In some embodiments, the identifying information comprises a signature of the occupant. In some embodiments, the identifying information comprises biometric information of the occupant (e.g., a retinal scan, an iris scan, a fingerprint scan, and/or a photograph of the occupant's face). In some embodiments, the identifying information comprises a photograph of an authenticating document of the occupant.

Of course, the present disclosure is not limited to the above features and advantages. Indeed, those skilled in the art will recognize additional features and advantages upon reading the following detailed description, and upon viewing the accompanying drawings Also, embodiments described herein may be taken independently or in any combination. Features described in connection with one embodiment are applicable to all embodiments, unless such features are incompatible.

DETAILED DESCRIPTION

The present disclosure describes methods and devices for authenticating an occupant of a vehicle. This may be used, for example, to verify that a vehicle occupant trying to operate a rental vehicle (e.g., a rental car) is actually authorized to operate the vehicle. This may also be used, for example, in non-rental vehicles for theft-prevention. The authentication could be performed based on a variety of pieces of identifying information, such as an authentication code, a signature, a retinal scan, an iris scan, a fingerprint scan, a photograph of an occupant's face, etc. If it is determined that a particular occupant is not authorized to operate a vehicle, then full operation of the vehicle can be disabled (e.g., by communicating with a vehicle ignition over a vehicle bus).

Figure 2:
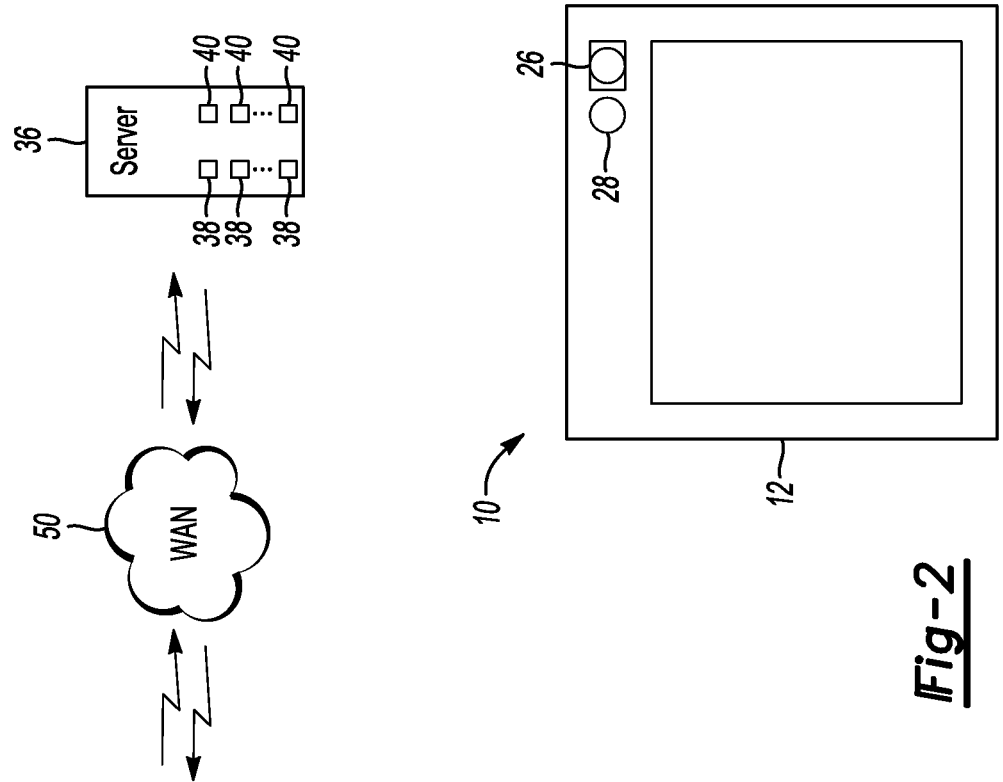
FIG. 2 schematically illustrates an example embodiment of the authentication system of FIG. 1.
Figure 1:
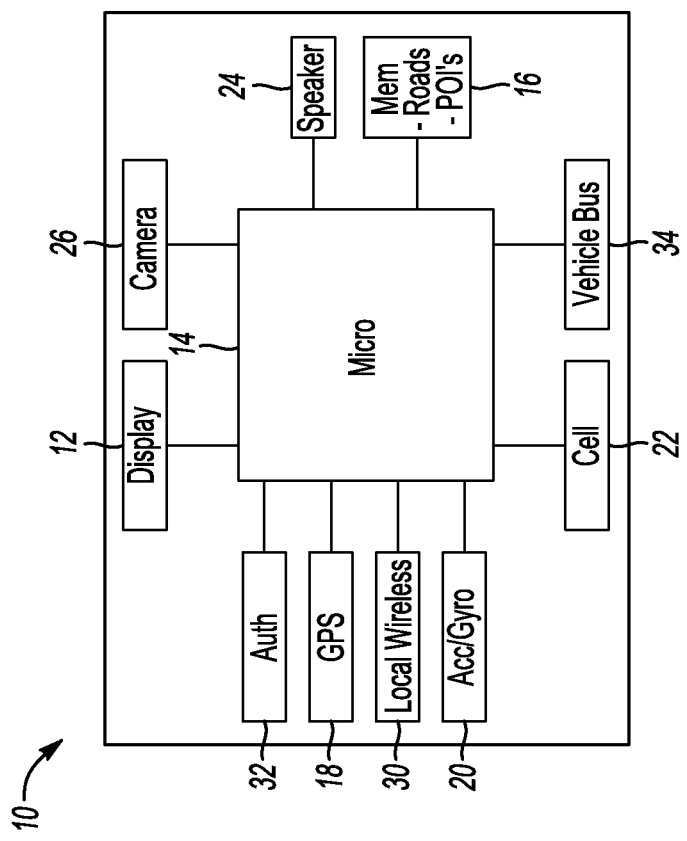
FIG. 1 schematically illustrates an example authentication system and associated authentication server.

FIGS. 1-2 illustrate example features for an authentication system 10. Although these example embodiments of the authentication system 10 are shown and described herein in connection with a navigation system installed into a vehicle, it should be noted that the navigation functions are not critical to the present disclosure. Further, the authentication system 10 could be installed as part of the OEM vehicle equipment, as part of the vehicle interior, or as shown, as a separately installed appliance. The particular example described below is in the context of a navigation system in a rental vehicle, where the authentication can be used to authenticate a driver of the rental vehicle. Again, this context is primarily for purposes of illustration, and the present disclosure is not limited to rental vehicles or to vehicles.

FIG. 1 is a high-level schematic showing some components of the authentication system 10, in the exemplary configuration as part of a navigation system. The authentication system 10 includes at least one microprocessor 14 having memory 16 (or other computer accessible storage). The memory 16 stores the programs executed by the microprocessor 14 for performing the functions described herein. In embodiments in which a navigation system is included, the memory 16 may also store a database of roads and a database of points of interest to which the user can request a route via the roads. The databases of roads and points of interest may cover a plurality of states, provinces and/or countries. Of course, the microprocessor 14 could include multiple microprocessors or multiple cores or multiple virtual processors and the memory 16 could include any combination of electronic, magnetic, optical or even off-board storage.

The authentication system 10 may also contain one or more position-determining devices, such as GPS 18, accelerometer/gyroscope 20, etc. The authentication system 10 may include wireless communication, such as cellular circuitry 22. The authentication system 10 may include a speaker 24 for communicating routing instructions to the driver. The particular configuration of route guidance and position-determining hardware and software is not critical to the present disclosure because many configurations are known to those of ordinary skill in the art.

The authentication system 10 may include local wireless communication circuitry 30, such as NFC, Bluetooth, WiFi, WiFi Direct, Bluetooth or Bluetooth Low Energy (BLE), or the like, as newer communication protocols are developed. The authentication system 10 may also include specialized or dedicated authentication hardware 32, which may include a fingerprint scanner, retina scanner, iris scanner, electronic signature pad, or pin pad, for example. Alternatively, the camera 26 could be used as a fingerprint scanner, retina, and/or iris scanner. In some embodiments, the display 12 is a touchscreen display that may, for example, be used as a pinpad.

As shown in FIG. 1, the authentication system 10 may be in communication with the vehicle ignition 42, such as via the vehicle bus 34 (e.g. OBD-II or variations thereof). Via this communication, the authentication system 10 can give the vehicle a command whether or not to permit use of the vehicle (either by preventing ignition 42, in the case of an internal combustion engine, or preventing activation of an electric motor, or any way in which use or movement of the vehicle can be selectively prevented/permitted).

FIG. 2 illustrates the authentication system 10 according to one example of the present disclosure. The authentication system 10 in FIG. 2 includes a display 12, which may be a touchscreen display. The authentication system may be installed or at least located in a vehicle. The authentication system 10 in FIG. 2 includes an embedded camera 26 and may include a flash 28 (such as an LED flash).

Figure 3:
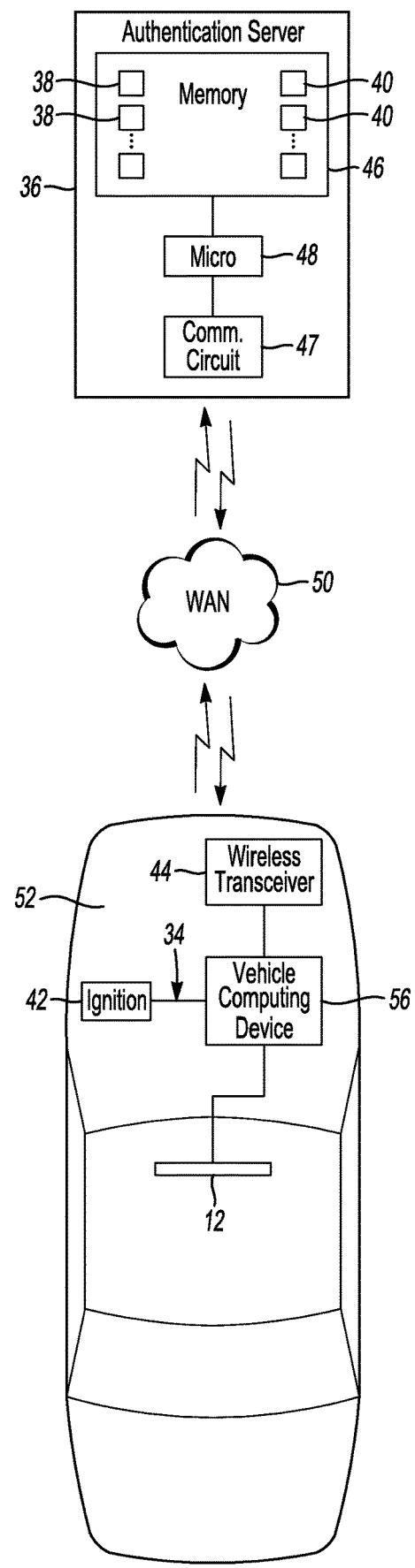
FIG. 3 schematically illustrates a car that includes aspects of the authentication system of FIG. 1.

FIG. 3 schematically illustrates a vehicle 52 that includes aspects of the authentication system 10 of FIG. 1. Although the vehicle 52 in FIG. 3 is a car, it is understood that other vehicles could be used (e.g., buses, boats, motorcycles, aircraft etc.). Reference numeral 52 is used generically herein to refer to a vehicle, without requiring that the vehicle at issue must be a car. In FIG. 3, the authentication system 10 includes a vehicle computing device 56 that is in communication with a remote authentication server 36 via a wide area network (WAN) 50, such as the Internet. The vehicle computing device 56 includes at least the microprocessor 14 and memory 16 of FIG. 2. In some embodiments, the vehicle computing device 56 accesses the WAN 50 via its wireless transceiver 44 (see FIG. 3), which may correspond to the cellular circuitry 22 (or any other communication system off the vehicle, such as WiFi through the local wireless communication circuitry 30). In one or more embodiments, the cellular circuitry 22 uses GSM, W-CDMA, LTE, or any other 3GPP-based wireless communication standard. As also shown in FIG. 3, the authentication server 36 accesses the WAN 50 using its communication circuit 47, which may use a wireless connection (e.g., according to a 3GGPP standard, 802.11 standard, or the like) or a wired connection.

Figure 4:
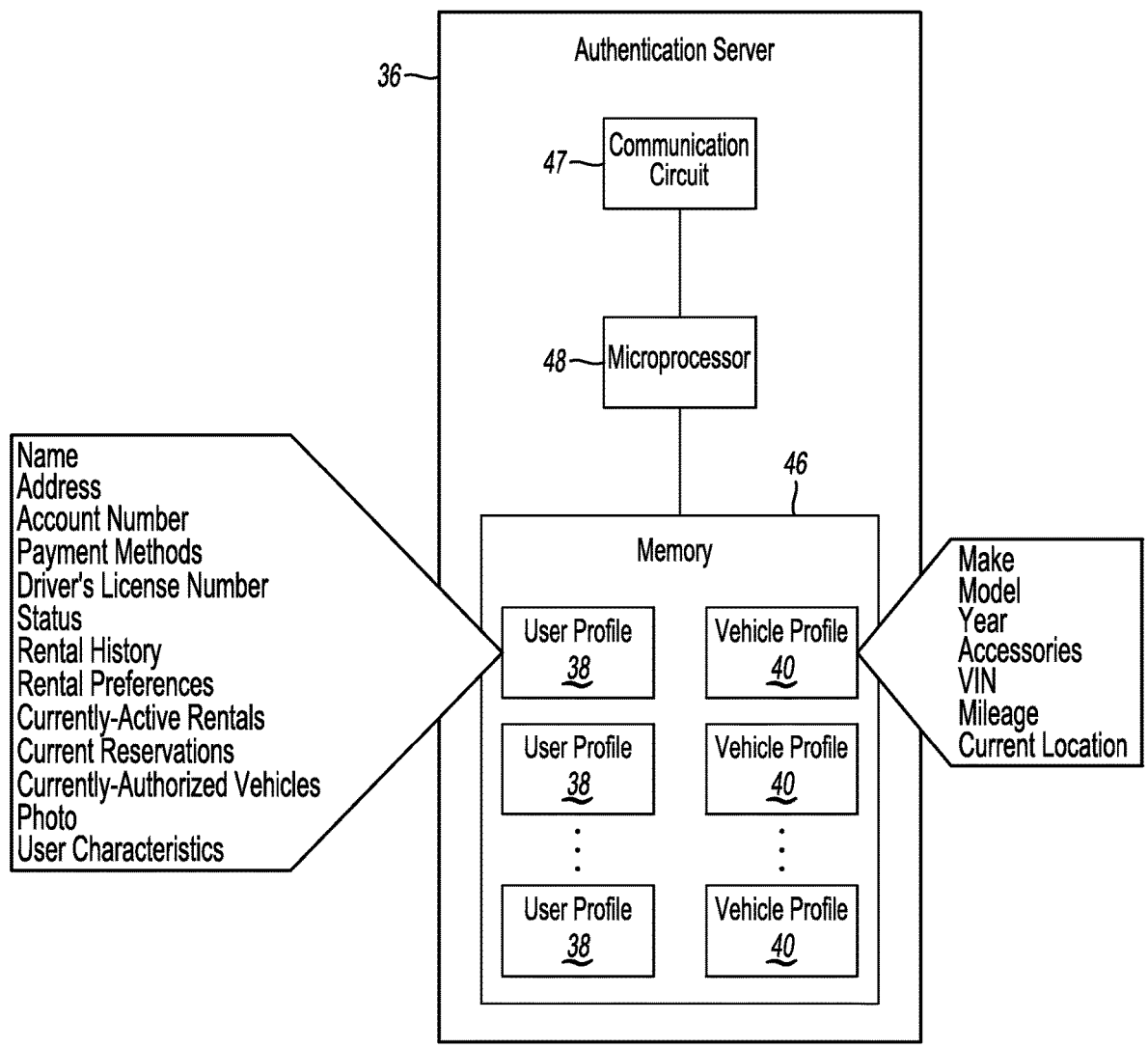
FIG. 4 schematically illustrates the authentication server of FIG. 1 in greater detail.

The remote authentication server 36 includes a microprocessor 48 that is operatively connected to its communication circuit 47, and to memory 46. The memory 46 stores a plurality of user profiles 38 and a plurality of vehicle profiles 40. As shown in FIG. 4, the vehicle profiles 40 may contain identifying information for a plurality of vehicles in a fleet, such as rental vehicles. The vehicle profiles 40 may include information indicating make, model, year, accessories, VIN, mileage (as continuously or periodically updated by the system 10), current location (as may be updated continuously or as appropriate by the system 10). As shown in FIG. 4, the user profiles 38 may contain identifying information for a plurality of users or potential users (renters) of the vehicles in a rental fleet, such as information identifying one or more of the following: name, address, account number, payment methods, driver's license number, status (such as preferred customer status), rental history, rental preferences, currently-active rentals, current reservations, currently-authorized vehicles (e.g. links to the vehicle profile(s) of currently assigned/rented vehicle(s)). The user profile 38 may also include a photo of the user's face or identifying characteristics of the user's face, as may be gathered from one or more photos.

In one example embodiment, the authentication system 10 can use the camera 26, the local wireless communication circuitry 30 and/or the authentication hardware 32 for user authentication for the rental of the vehicle 52. The authentication system 10 sends information from a vehicle occupant to the authentication server 36. If the server 36 authenticates the occupant to drive the vehicle, the authentication server 36 may send the authentication system 10 a confirmation signal. Upon receiving the confirmation signal from the server 36, the authentication system 10 may send a signal to the vehicle bus 34 permitting the vehicle to start or to move. Alternatively, the authentication system 10 may perform the authentication locally, if it has stored locally the authentication information required to be matched by the user.

For example, the camera 26 can be used to take a photo of the user (e.g. facial recognition) and/or the user's driver's license or the user's signature or other authenticating documents or other approved object. The image may be processed on board and/or transmitted to the authentication server 36 (or a different server) for verification that the user is authorized to drive the vehicle. The authentication server 36 may perform the authentication automatically (by a processor on the authentication server 36) or the authentication may be performed by a person accessing the server 36. The authentication server 36 may authenticate the user by comparing the image of the user to an image stored in the authentication server 36, or by comparing the image of the driver's license (or the information gleaned from the image) to the driver's license information stored in the user's profile 38, for example.

The authentication system 10 may receive an authentication code, such as a PIN or password, from the user (e.g. on the touch display 12) and either authenticate the PIN locally or transmit to the authentication server 36 for authentication. This could also be in combination with authenticating the image of the user and/or an approved object.

The authentication system 10 may authenticate based upon an NFC card in the user's mobile phone communicating with the local wireless communication circuitry 30. Again, this could be in combination with the other methods described herein. In some such embodiments, the authentication code may be received via the local wireless communication circuitry 30 instead of being directly entered on touch display 12.

In some embodiments, the authentication system 10 performs an initial authentication locally, and then requests that the remote authentication server 36 performs a secondary authentication (e.g., one that transmits an authentication code to a mobile device of a vehicle occupant as a second layer of authentication). An example of this is described in greater detail in FIG. 6. For example, upon initiation from a vehicle occupant at the authentication system 10, the authentication server 36 may transmit a PIN or other code to the user's registered mobile device (cell phone, smart phone, tablet, laptop, etc.), which is then either read by the local wireless communication circuitry 30 or entered manually by the user on the touchscreen display 12. Again, this can be in combination with the other methods described herein.

In some embodiments, the authentication system 10 temporarily permits full operation of a vehicle 52 until a desired authentication can be performed. For example, in the event that the authentication system 10 does not have a local database of approved images, codes, users, etc. and/or does not have connectivity to the server 36, the authentication system 10 can permit temporary operation of the vehicle 52 until it can authenticate the user. Alternatively, if the authentication system 10 has performed a partial authentication of the user via one of the methods described herein, but is unable to perform a second authentication method, the authentication system 10 can permit temporary operation of the vehicle 52. Once the authentication system 10 is able to completely authorize the user (e.g. once it has connectivity to authentication server 36), it can permit full operation of the vehicle 52. On the other hand, if the authentication system 10 determines that the user is not authorized, the authentication system 10 can disable the vehicle 52 (e.g. prevent it from re-starting and/or disable the vehicle when it is stopped and/or otherwise safe to do so) and communicate an alert to the authentication server 36 and/or to the authorities, including the current location of the vehicle 52 as determined by the location-determining systems.

The camera 26 could also be used for reading barcodes or Quick Response (QR) codes from a user, reading an address (e.g. for a navigation destination), reading a PIN code or other user identification information.

Figure 5:
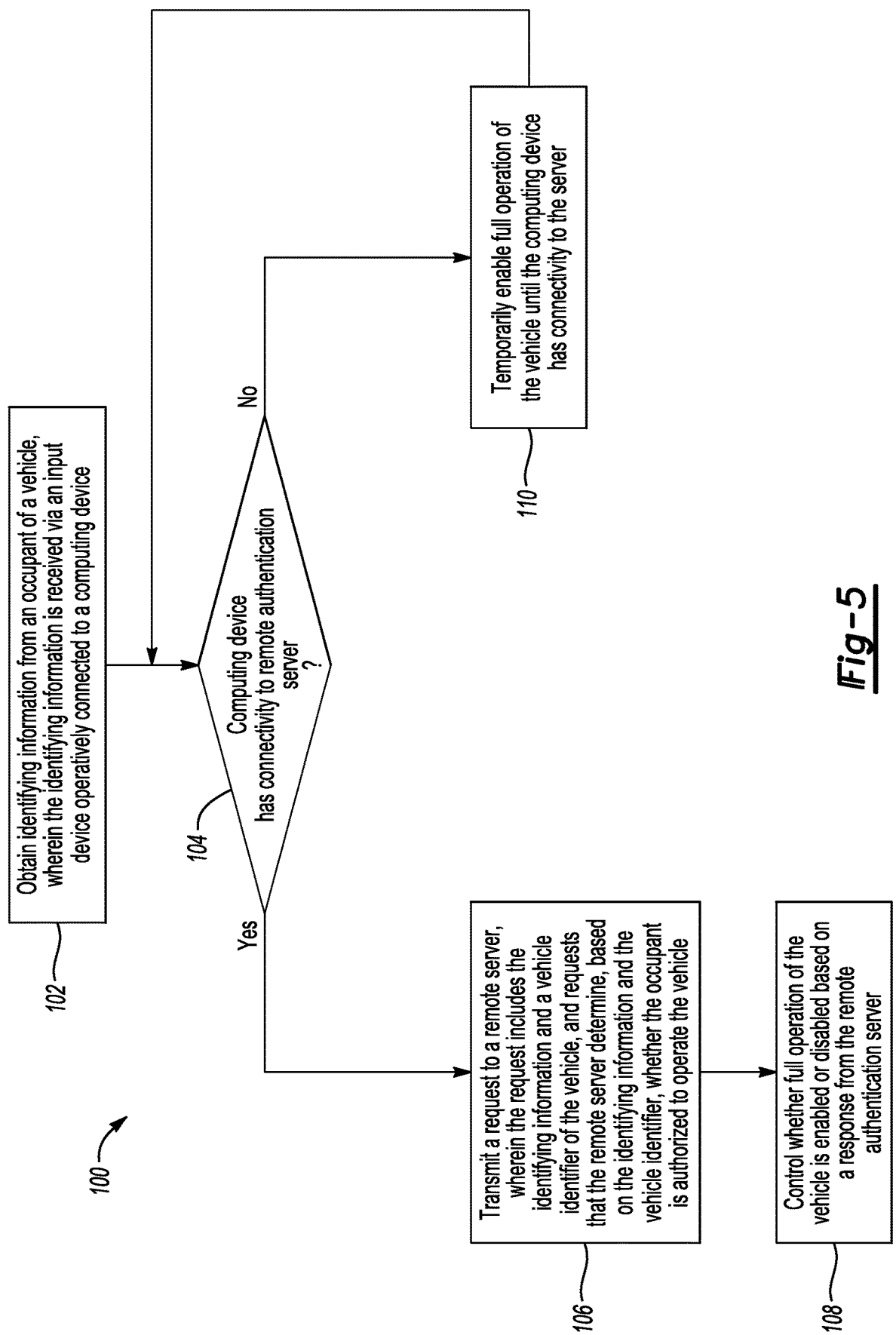
FIG. 5 is a flowchart of an example method for authenticating a vehicle occupant.

FIG. 5 is a flowchart of an example method 100 for authenticating a vehicle occupant. The method 100 is implemented by a computing device, such as computing device 56 in vehicle 52. The computing device 56 obtains identifying information from an occupant of the vehicle (block 102) via an input device operatively connected to the computing device (e.g., touch display 12 or authentication hardware 32). If the computing device 56 has connectivity to a remote authentication server (a "yes" to block 104), the computing device 56 transmits a request to the authentication server (block 106), wherein the request includes the identifying information and a vehicle identifier of the vehicle 52, and requests that the authentication server determine, based on the identifying information and the vehicle identifier, whether the occupant is authorized to operate the vehicle 52. The computing device 56 controls whether full operation of the vehicle 52 is enabled or disabled based on a response from the remote authentication server (block 108). If the computing device 56 lacks connectivity to the remote authentication server (a "no" to block 104), the computing device 56 temporarily enables full operation of the vehicle 52 until the computing device has connectivity to the authentication server (block 110), at which time blocks 106-108 could be performed.

In some embodiments, the response is received at the computing device 56 from the remote authentication server 36, and indicates whether the occupant is authorized to operate the vehicle 52. In some such embodiments, controlling whether full operation of the vehicle 52 is enabled or disabled (block 108) comprises disabling the vehicle 52 if the response indicates that the occupant is not authorized to operate the vehicle 52.

In some embodiments, the response is sent from the remote authentication server 36 to a mobile device of the occupant and includes an authentication code. In some such embodiments, controlling whether full operation of the vehicle 52 is enabled or disabled based on the response (block 108) comprises enabling full operation of the vehicle 52 if the authentication code is correctly received from the occupant; and disabling full operation of the vehicle if either of the following occurs: an incorrect authentication code is received from the occupant, or no authentication code is received from the occupant within a predefined time period.

In one or more embodiments of the method 100, disabling full operation of the vehicle 52 comprises transmitting a command on vehicle bus 34 of the vehicle 52 to disable ignition 42 of the vehicle 52. Optionally, an alert may also be transmitted in conjunction with disabling full operation of the vehicle 52 (e.g., to a vehicle owner, vehicle rental company, or law enforcement).

Figure 6:
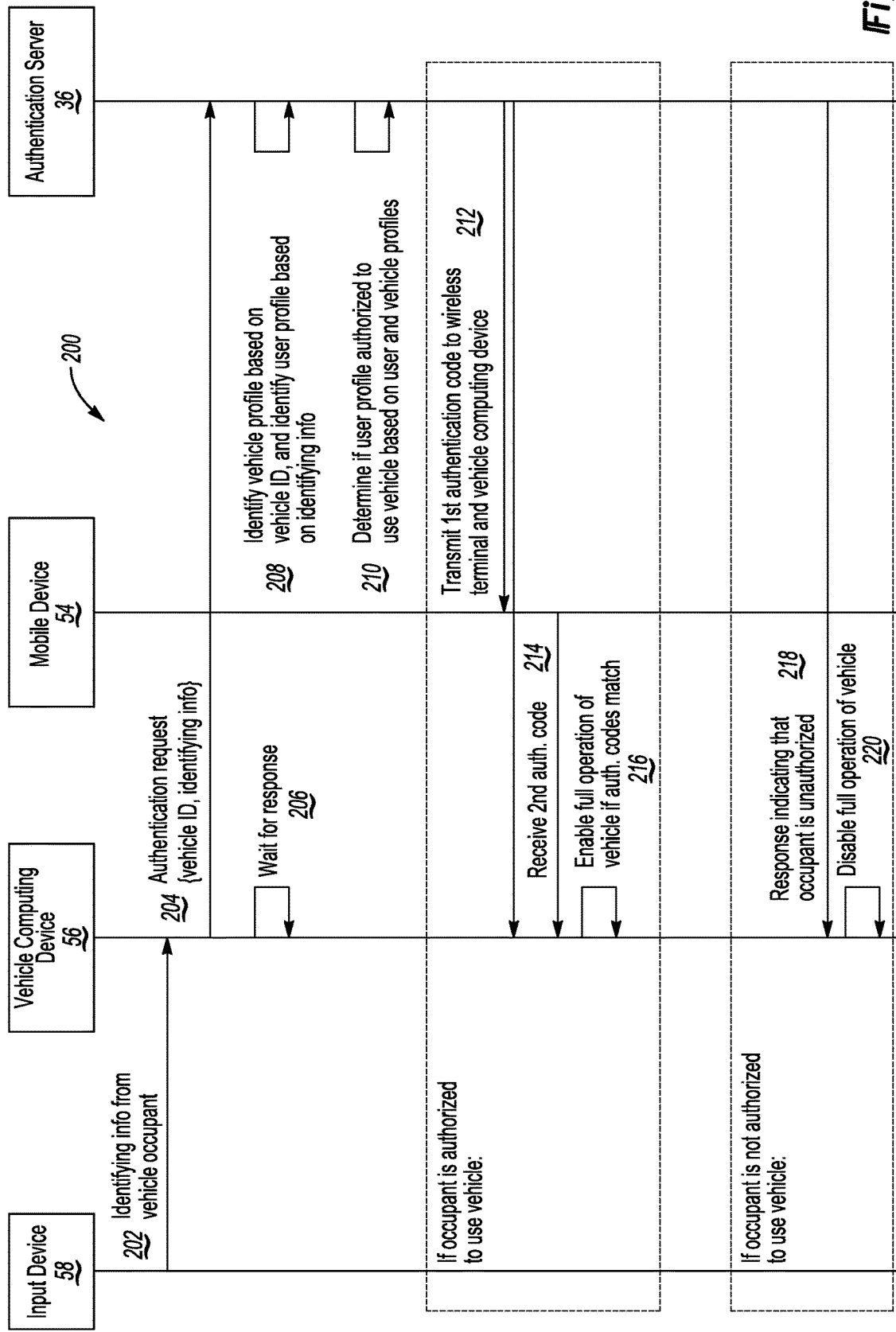
FIG. 6 is a signaling diagram illustrating an embodiment of the method of FIG. 5.

FIG. 6 is a signaling diagram 200 illustrating an embodiment of the method 100 of FIG. 5. The devices involved in the signaling diagram include the authentication server 36, a mobile device 54 of a vehicle occupant, a vehicle computing device 56 that includes at least the microprocessor 14 and memory 16, and an input device 58 (e.g., touchscreen display 12, camera 26, local wireless communication circuitry 30, and/or authentication hardware 32).

The vehicle computing device 56 receives identifying information from a vehicle occupant via input device 58 (202). This may include information entered by the occupant (e.g., an authentication code or signature), or information obtained from the occupant (e.g., a retinal scan, an iris scan, a fingerprint scan, and/or a photograph of the occupant's face). The vehicle computing device 56 transmits an authentication request to the authentication server 36 that includes an identifier of the vehicle and includes the identifying information (204). The vehicle computing device 56 then waits for a response (206).

Authentication server 36 receives the request of 204, identifies a corresponding vehicle profile 40 based on the vehicle ID, and identifies a corresponding user profile based on the identifying information (208). The authentication server 36 determines if the user profile is authorized to use the vehicle 52 based on the user profile 38 and vehicle profile 40 (210).

If the occupant is authorized to use the vehicle 52, the authentication server transmits a first authentication code to the mobile device 54 and to the vehicle computing device 56 (212). The vehicle computing device 56 then receives the second authentication code from the mobile device 54 (214) (e.g., in a wireless transmission), and enables full operation of the vehicle 52 if the authentication codes match (216). The authentication codes may be PIN codes, for example. In an alternative embodiment, the second authentication code in item 214 is instead received from the input device 58, or some other input device, and is not received from the mobile device 54 (i.e., the occupant views the code on their mobile device and manually enters it using input device 58).

If the occupant is not authorized to use the vehicle 52, the authentication server transmits a response indicating that the occupant is unauthorized (218), and the vehicle computing device 56 disables full operation of the vehicle (220).

Although FIG. 6 illustrates a dual authentication system in which there is a first authentication at 210 performed by the authentication server 36 and a second authentication 216 performed by the vehicle computing device 56, it is understood that aspects of FIG. 6 could be used in a single authentication method. In such embodiments, items 212-216 would be replaced by the authentication server 36 sending a response directly to the vehicle indicating that the occupant is authorized, and the vehicle computing device 56 could respond to enabling full operation of the vehicle, without involving the mobile device 54.

In some embodiments of the method 100, the vehicle computing device 56 performs an initial determination, locally at the computing device 56 and based on additional identifying information from the occupant, of whether the occupant is authorized to operate the vehicle 52. In such embodiments, the vehicle computing device 56 disables full operation of the vehicle 52 if the initial determination indicates that the occupant is not authorized to operate the vehicle, and the transmitting of the request to the remote server (block 106) is only performed if the initial determination indicates that the occupant is authorized to operate the vehicle. For example, the initial determination could be whether a PIN code was entered properly, and a second authentication (performed by authentication server 36 and corresponding to 208-210) could be whether a photograph of a vehicle occupant is part of a user profile that is authorized to operate the vehicle 52.

In some embodiments, the identifying information being analyzed comprises a photograph of an authentication document of the occupant (e.g., a photograph of the occupant's passport or driver's license). Authentication of such an occupant may include verifying the accuracy of information on that document (e.g., a driver's license ID, an address, a birthday, etc.). Such embodiments may use optical character recognition (OCR) to read data from an authentication document.

Although a number of the features above have been discussed in the context of a rental car, it is understood that the present disclosure is not limited to rental vehicles. The methods and devices discussed above could be used by a vehicle owner for theft prevention, for example.

In accordance with the provisions of the patent statutes and jurisprudence, exemplary configurations described above are considered to represent a preferred embodiment of the present disclosure. However, it should be noted that the present disclosure can be practiced otherwise than as specifically illustrated and described without departing from its spirit or scope.

What is claimed is:

1. A method implemented by a computing device in a vehicle, comprising:
   obtaining identifying information from an occupant of the vehicle, wherein the identifying information is received via an input device operatively connected to the computing device;
   determining whether the computing device has connectivity to a remote authentication server;
   based on a determination that the computing device lacks connectivity to the remote authentication server, temporarily enabling full operation of the vehicle until the computing device has connectivity to the remote authentication server; and based on a determination that the computing device has connectivity to the remote authentication server:

transmitting a request to the remote authentication server, wherein the request includes the identifying information and a vehicle identifier of the vehicle, and requests that the remote authentication server determine, based on the identifying information and the vehicle identifier, whether the occupant is authorized to operate the vehicle; and controlling whether full operation of the vehicle is enabled or disabled based on a response sent from the remote authentication server to a mobile device of the occupant that is separate from the computing device, wherein the response includes an authentication code;

enabling full operation of the vehicle based on the authentication code being correctly received from the occupant; and disabling full operation of the vehicle based on either of the following:

an incorrect authentication code is received from the occupant;

no authentication code is received from the occupant within a predefined time period.

2. The method of claim 1, wherein disabling full operation of the vehicle comprises transmitting a command on a vehicle bus of the vehicle to disable an ignition of the vehicle.

3. The method of claim 1:

wherein the authentication code is received from the occupant via the same or another input device that is operatively connected to the computing device; or wherein the authentication code is received from the occupant as a wireless transmission from the mobile device of the occupant.

4. The method of claim 1, wherein the identifying information comprises entered by the occupant or received from a mobile device of the occupant.

5. The method of claim 1, wherein the identifying information comprises a signature of the occupant.

6. The method of claim 1, wherein the identifying information comprises biometric information of the occupant.

7. The method of claim 6, wherein the biometric information comprises one or more of a retinal scan, an iris scan, a fingerprint scan, and a photograph of the occupant's face.

8. The method of claim 1, wherein the identifying information comprises a photograph of an authenticating document of the occupant.

9. The method of claim 1, further comprising:

performing an initial determination, locally at the computing device and based on additional identifying information from the occupant, of whether the occupant is authorized to operate the vehicle; and disabling full operation of the vehicle based on the initial determination indicating that the occupant is not authorized to operate the vehicle;

wherein said transmitting the request to the remote authentication server is only performed based on the initial determination indicating that the occupant is authorized to operate the vehicle.

10. A computing device comprising:

a wireless transceiver configured to provide connectivity to a remote authentication server;

an input device; and processing circuitry operatively connected to the wireless transceiver and the input device and configured to:

obtain identifying information from an occupant of a vehicle, wherein the identifying information is received via the input device;

determine whether the computing device has connectivity to a remote authentication server;

based on a determination that the computing device lacks connectivity to the remote authentication server, temporarily enable full operation of the vehicle until the computing device has connectivity to the remote authentication server; and based on a determination that the computing device has connectivity to the remote authentication server:

transmit a request to the remote authentication server, wherein the request includes the identifying information and a vehicle identifier of the vehicle, and requests that the remote authentication server determine, based on the identifying information and the vehicle identifier, whether the occupant is authorized to operate the vehicle;

control whether full operation of the vehicle is enabled or disabled based on a response sent from the remote authentication server to a mobile device of the occupant that is separate from the computing device, wherein the response includes an authentication code;

enable full operation of the vehicle based on the authentication code being correctly received from the occupant; and disable full operation of the vehicle based on either of the following:

an incorrect authentication code is received from the occupant;

no authentication code is received from the occupant within a predefined time period.

11. The computing device of claim 10, wherein to disable full operation of the vehicle, the processing circuitry is configured to transmit a command on a vehicle bus of the vehicle to disable an ignition of the vehicle.

12. The computing device of claim 10:

wherein the authentication code is received from the occupant via the same or another input device; or wherein the authentication code is received from the occupant as a wireless transmission from the mobile device of the occupant.

13. The computing device of claim 10, wherein the identifying information comprises a second authentication code entered by the occupant or received from a mobile device of the occupant.

14. The computing device of claim 10, wherein the identifying information comprises a signature of the occupant.

15. The computing device of claim 10, wherein the identifying information comprises biometric information of the occupant.

16. The computing device of claim 15, wherein the biometric information comprises one or more of a retinal scan, an iris scan, a fingerprint scan, and a photograph of the occupant's face.

17. The computing device of claim 10, wherein the identifying information comprises a photograph of an authenticating document of the occupant.

18. The computing device of claim 10, wherein the processing circuitry is further configured to:

perform an initial determination, locally at the computing device and based on additional identifying information from the occupant, of whether the occupant is authorized to operate the vehicle; and disable full operation of the vehicle based on the initial determination indicating that the occupant is not authorized to operate the vehicle;

wherein the transmission of the request to the remote authentication server is only performed based on the initial determination indicating that the occupant is authorized to operate the vehicle.

* * * * *